United States Patent
Bhandari et al.

(10) Patent No.: US 8,807,466 B2
(45) Date of Patent: Aug. 19, 2014

(54) METHOD AND SYSTEM FOR RECLAMATION OF BATTERY CONSTITUENTS

(75) Inventors: Ashish Bhandari, Niagara Falls (CA); James N. Ewles, St. Catharines (CA); Wayne Elliott, Wainfleet (CA)

(73) Assignee: Raw Materials Company Inc., Port Colborne, Ontario (CA)

( * ) Notice: Subject to any disclaimer, the term of this patent is extended or adjusted under 35 U.S.C. 154(b) by 418 days.

(21) Appl. No.: 13/153,629

(22) Filed: Jun. 6, 2011

(65) Prior Publication Data

US 2012/0305684 A1    Dec. 6, 2012

(51) Int. Cl.
| | |
|---|---|
| *B02C 11/08* | (2006.01) |
| *H01M 10/54* | (2006.01) |
| *B03B 9/06* | (2006.01) |
| *H01M 10/34* | (2006.01) |
| *H01M 10/052* | (2010.01) |

(52) U.S. Cl.
CPC .............. *B03B 9/061* (2013.01); *H01M 10/34* (2013.01); *Y02E 60/12* (2013.01); *H01M 10/54* (2013.01); *H01M 10/052* (2013.01); *B03B 2009/066* (2013.01)
USPC .................................. 241/23; 241/49; 241/24

(58) Field of Classification Search
USPC ........................................... 241/2, 23, 24, 49
See application file for complete search history.

(56) References Cited

U.S. PATENT DOCUMENTS

| | | | |
|---|---|---|---|
| 4,026,477 A | 5/1977 | Tremolada | |
| 4,775,107 A | 10/1988 | Heng et al. | |
| 5,456,992 A | 10/1995 | Elliott | |
| 6,899,294 B2 * | 5/2005 | MacNeil | 241/24.12 |
| 8,210,456 B2 * | 7/2012 | Stevens | 241/19 |
| 2010/0230518 A1 * | 9/2010 | Ewles et al. | 241/23 |

FOREIGN PATENT DOCUMENTS

| | | |
|---|---|---|
| CA | 2105375 A1 | 3/1994 |
| CA | WO 2009/028795 A2 | 3/2009 |
| CA | 2730320 A1 | 9/2010 |

* cited by examiner

*Primary Examiner* — Shelley Self
*Assistant Examiner* — Homer Boyer
(74) *Attorney, Agent, or Firm* — Gowling Lafleur Henderson LLP

(57) ABSTRACT

In a method of reclaiming constituent components of sealed batteries, the batteries are initially ground to form a ground feedstock. The ground feedstock is heated to form a dried feedstock. The dried feedstock is screen separated into a coarse fraction and a powder fraction, the coarse fraction including a magnetic fraction and a non-magnetic fraction. The coarse fraction and the powder fraction are further vibratorily segregated. The magnetic fraction may be magnetically extracted from the coarse fraction, while the powder fraction is outputted.

10 Claims, 2 Drawing Sheets

METHOD AND SYSTEM FOR RECLAMATION OF BATTERY CONSTITUENTS

BACKGROUND

The present invention relates to a method and system for reclaiming the constituent components from dry cell batteries.

The vast majority of commonly-used batteries are sealed cell alkaline batteries. Upon expiration of their useful life, these batteries are simply discarded, eventually finding their way into already-overburdened landfill disposal sites.

A known method for reclaiming the constituent components of alkaline batteries involves mechanically removing the outer casing from the battery cell, followed by chemical processing to separate the remaining constituent solid components of the battery cell. The major constituent solid components of the battery cells variously comprise compounds of carbon, zinc, potassium, and manganese.

There are several problems with using chemical separation processes for such purpose. Firstly, chemical processing is expensive, in context of the relatively lower value of the solid constituents of the battery. Secondly, additional chemical effluent waste streams are created in applying the chemical separation processes, with attendant environmental concerns inherent thereto.

SUMMARY

Provided is a method of reclaiming constituent components of a feedstock of sealed batteries. The method comprises grinding the feedstock to form a ground feedstock, heating the ground feedstock to form a dried feedstock, screen separating the dried feedstock into a coarse fraction and a powder fraction, the coarse fraction including a magnetic fraction and a non-magnetic fraction, vibrating the coarse fraction and the powder fraction to segregate the coarse fraction from the powder fraction, and magnetically extracting the magnetic fraction from the coarse fraction.

In one embodiment, the powder fraction of the dried feedstock comprises zinc oxide, manganese dioxide, and potassium hydroxide.

In another embodiment, the sealed batteries are alkaline batteries containing mercury, further comprising heating the ground feedstock below the boiling point of mercury wherein the heating evaporates a portion of the mercury from the ground feedstock.

In yet another embodiment, the method further comprises forcing air through the ground feedstock during the heating to flush the mercury vapor from the ground feedstock.

The method may further comprise sequestering the mercury vapor in a scrubber.

In a further embodiment, the method further comprises precipitating particulates contained in the forced air by swirling the forced air.

In another embodiment, the heating is performed to achieve a specified maximum moisture content for the powder fraction of the dried feedstock.

Also provided is a method of reclaiming constituent components of a feedstock of sealed batteries, the sealed batteries including at least a mercury constituent component. The method comprises grinding the feedstock to form a ground feedstock, heating the ground feedstock to form a dried feedstock, the heating performed below the boiling point of mercury wherein a portion of the mercury constituent is evaporated from the dried feedstock, screen separating the dried feedstock into a coarse fraction and a powder fraction, the coarse fraction including a magnetic fraction and a non-magnetic fraction, vibrating the coarse fraction and the powder fraction to segregate the coarse fraction from the powder fraction, and outputting the powder fraction.

Also provided is a system for reclaiming constituent components from a feedstock of sealed batteries. The system comprises a grinder for grinding the sealed batteries into a ground feedstock, an oven for drying the ground feedstock into a dried feedstock, the oven including conveyor means for ingress of the ground feedstock and egress of the dried feedstock, screen separating means for receiving the dried feedstock and separating a coarse fraction and a powder fraction of the dried feedstock, the coarse fraction including a magnetic fraction and a non-magnetic fraction, vibrating means receiving the dried feedstock from the screen segregating means, the vibrating means for segregating the coarse fraction from the powder fraction, and a magnetic extractor for extracting the magnetic fraction from the coarse fraction.

In one embodiment, the vibrating means comprises a vibrating mesh.

In another embodiment, the system further comprises a cyclone and a scrubber disposed generally above the oven, and means for forcing air upwardly through the oven, the cyclone and the scrubber.

In another embodiment, the system may further comprise at least one particulate filter situated between the oven and the scrubber, the at least one particulate filter configured to precipitate particles contained in the forced air.

BRIEF DESCRIPTION OF THE DRAWINGS

In the figures which illustrate an example embodiment of the invention.

DETAILED DESCRIPTION

Technically, a battery is a connected group of electrical cells. Thus, a 9 V battery is a true battery, whereas, for example, AAA through D size batteries are cells. In this specification, the term battery is used as a general term to mean, and include, both true batteries and cells.

The central core of an alkaline cylindrical button cell is the anode, which comprises a dispersion of zinc oxide powder in a gel containing a potassium hydroxide electrolyte. This core is surrounded by a separator which may be a non-woven layer of cellulose (paper) or a synthetic polymer (plastic). Surrounding the separator is an annular cathode which is a compressed paste of manganese dioxide with carbon (graphite) powder to increase conductivity within the cell. The anode, separator, and cathode are sealed in a ferrous-based casing, which is normally a drawn casing. Although some alkaline batteries are mercury-free, many spent alkaline batteries mercury include mercury as a constituent component.

Figure 1:
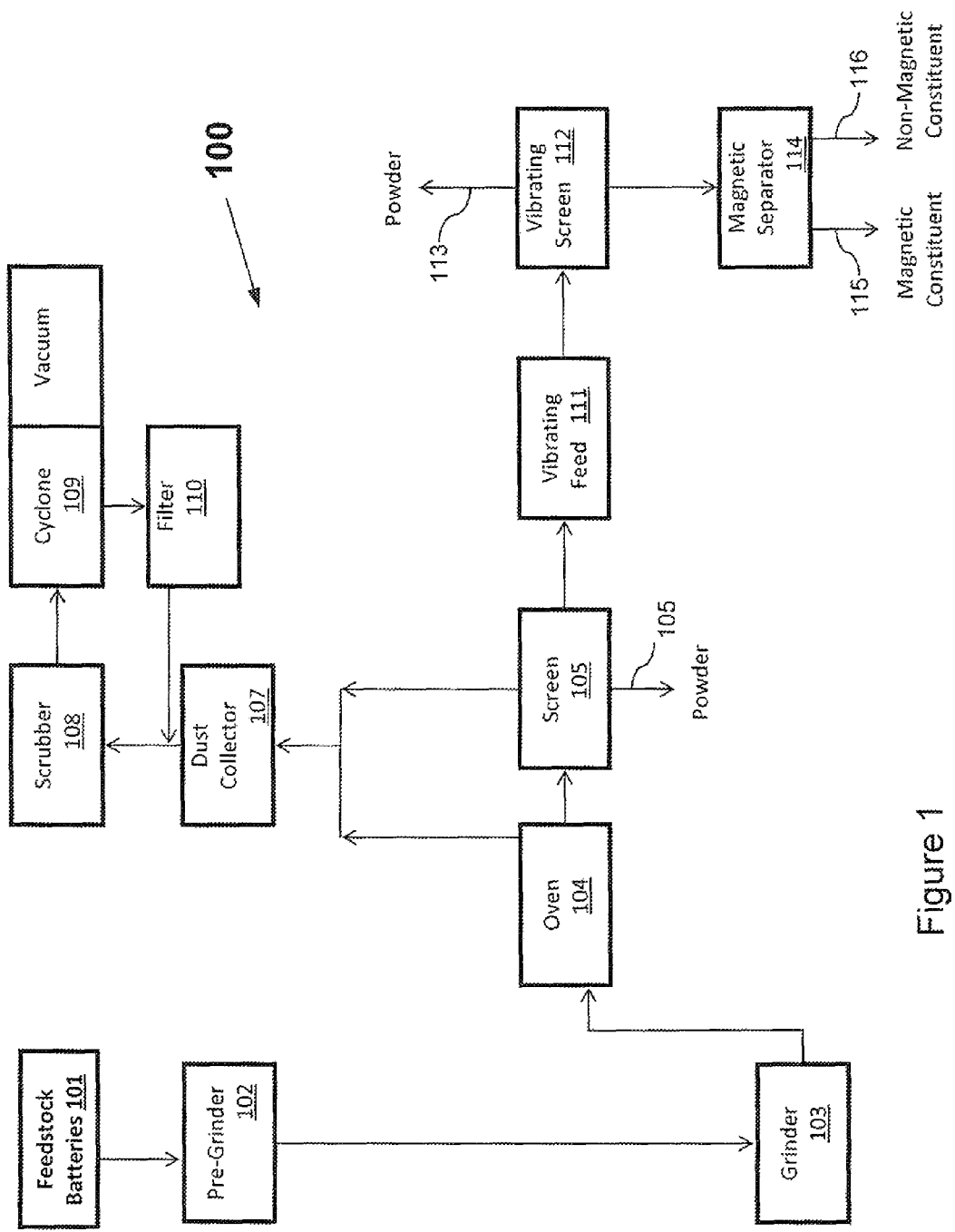
FIG. 1 schematic diagram of a system, in an embodiment, for reclamation of constituent components of sealed batteries.

Turning to FIG. 1, a system 100 for recycling sealed cell alkaline batteries has a pre-grinder 102 for pre-grinding the feedstock in order to rupture their sealed steel casings. Next the batteries may be further ground in secondary grinder 103, and are then conveyed downstream. The conveyor, which may be a chain conveyor or a belt conveyor with flights, assists in breaking up the feedstock into a more uniform material feed stream.

Grinders 102, 103 are linked to oven 104, such as by a conveyor, for linear transport of the ground feedstock to oven 104. The term oven conveyor, as will be used herein refers to the portion of such a transport conveyor that is generally traveling within the enclosure or confines of oven 104.

The time during which the ground feedstock remains in the oven conveyor, and the temperature of this conveyor as set within oven 104, are determined based on characteristics of the feedstock and desired properties of the powder output from the system.

While the temperature of oven 104 can be modified as needed, the requisite or appropriate heating time varies with battery composition, and can range up to 800° F. The heated feed stock could remain in the oven for typically from 3 to 25 minutes, again depending on the type of battery feedstock.

More specifically, a customer may specify a maximum (or a minimum) required moisture content, or dryness, and also specify the maximum mercury content for the powder output. Characteristics of the feedstock which impact the required heating time and temperature are the size of the battery cells, the age of the cells (newer batteries need to be run slower at higher temperatures), mercury content, and the type of battery.

While mercury has a boiling point of about 357° C., it is nevertheless volatile even at room temperature and therefore off-gases at the various air uptakes, as well as off-gassing in the oven conveyor.

By conveying the feedstock at elevated temperatures in the moisture and heavy metal removal system, the feedstock is dried, evaporation of mercury in the feedstock is promoted, and mercury content is reduced to significantly lower levels.

Feedstock leaving oven 104 via conveyor passes to a screen 105. This separates a coarser fraction of the dried feedstock from a finer, powder fraction. The powder fraction typically comprises a mixture of zinc oxide, manganese dioxide, and potassium hydroxide constituents. A 2 to 200 mesh size may be used for the screen, such that the finer powder fraction drops out through the sieve. This powder fraction may be thus be recovered as a finished, reclaimed product of the method herein.

Any remaining powder fraction is then fed by vibrating feed 111 through an additional vibrator screen 112 positioned downstream from screen 205, and be collected from vibrating screen 112 as output powder 113. The mesh size of screen 105 can be varied as required provided it is sufficiently fine enough to separate the powder fraction of the feedstock. Typically 2 to 200 mesh size can be used depending on the desired quality of the final product.

The outputted powder, in the case of alkaline battery feedstock, constituted typically of zinc oxide, manganese dioxide, and potassium hydroxide may be used in fertilizer, provided its mercury content has been sufficiently reduced. With the subject system, mercury concentrations down to undetectable levels may be achieved. All three of these compounds, zinc oxide, manganese dioxide and potassium hydroxide have been shown to be useful additives to fertilizer, depending on soil conditions and soil pH.

The coarser fraction typically comprises a magnetic fraction (the ground steel casing) along with a non-magnetic fraction (brass, cellulose (paper), graphite, and plastic). The non-magnetic portion of this is commonly known as fluff. This coarser fraction eventually passes to a magnetic separator 214, which may be a magnetic wheel.

Regardless of customer requirements, the feedstock must at least be sufficiently dry so that the ground constituents are separated at the screen separator 205 using, in one embodiment, an 80-2 mesh size for the screen, such that the finer powder fraction drops out through a sieve, separating it from the coarser fraction of the ground feedstock.

Still with regard to FIG. 1, there are air uptakes associated with each of oven 104 and screen 105. The air uptakes feed forced air, such as generated by a blower, to air scrubber 108 having attached cyclone 109. A vacuum source may be used to draw air through dust collector 107 to air scrubber 108. Dust collector 107 removes any large particles from the forced air stream before reaching scrubber 108. Air scrubber 108 also sequesters vapors in the moving air which, in the case of alkaline battery feedstock, will include mercury vapors evaporated from the ground feedstock at oven 104. Air scrubber 108 may be a venturi scrubber with a pH control system that ensures the solubility of vapors. With a venturi scrubber, the scrubber itself acts as the vacuum source. The cyclone swirls the moving air to drop out any wet powder or other particulate solids entrained in the moving air, and releases the cleaned air stream. In an alternate embodiment, rather than providing a vacuum source to draw vapors into the scrubber, blowers could be used for this purpose.

Magnetic extractor 114 extracts a magnetic portion, or magnetic fraction, of the dried feedstock, magnetic metal and electrical conducting constituents, namely steel, from the non-magnetic-metallic, electrically non-conducting constituent components, namely paper, plastic and fiber. Magnetic extractor 114, in one embodiment, may be a magnetic wheel. The resulting two output streams may then be reclaimed as magnetic output 115 and non-magnetic output 116

The reclaimed steel may be used as ferrous scrap in the steel industry. The recovered paper and plastic from the fluff may be burned for energy (for example, in oven 104).

The same process described for alkaline batteries may also be used for any of zinc carbon, zinc chloride, magnesium, and manganese batteries. The composition of the recovered powder fraction will vary somewhat, depending upon the type of battery which forms the feedstock. However, for all of these types of battery, the recovered powder fraction may be used in fertilizer.

Figure 2:
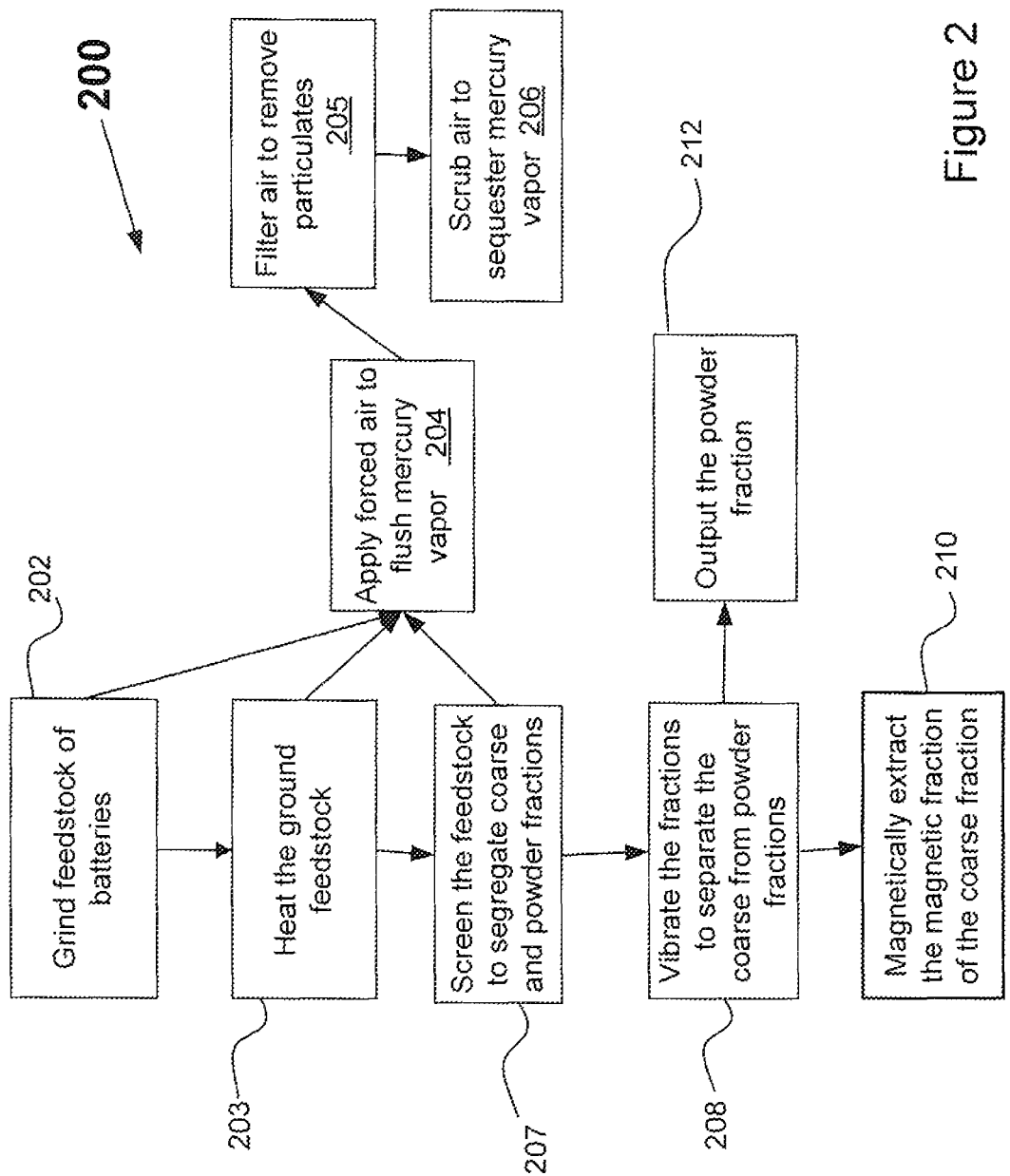
FIG. 2 is a flow diagram of a method, in an embodiment, for reclamation of constituent components of sealed batteries.

With regard now to FIG. 2, a flow diagram of a method, in an embodiment, for reclamation of constituent components of sealed batteries is depicted.

At step 202, a feedstock of sealed batteries is provided to pre-grinder 102 and/or grinder 103. At step 203, the ground feedstock is transported to oven 104, for heating and drying according to a pre-determined time and temperature heating profile. At step 207, the dried feedstock is screened, to segregate the powder fraction from the coarser fraction of the dried feedstock.

Step 204 may be applied to both oven 104 during step 203 and to screen 105 during step 207, and comprises forcing a stream of air through the feedstock being processed at steps 203, 207. At step 205, solid particulates contained in the forced air may be filtered at dust collector 107. At step 206, the filtered air stream may be scrubbed using the air scrubber 108/cyclone 109 system, to capture and sequester mercury vapor off-gassed or evaporated during steps 203 and 207.

At step 208, the dried feedstock is vibratorily screen to further the separation of powder and coarse fractions. The powder fraction may be outputted as a finished, reclaimed product at step 212.

At step, 210, the magnetic fraction of the dried feedstock is magnetically extracted using magnetic extractor 114.

While system 100 and method 200 have been discussed thus far primarily in the context of sealed dry alkaline batteries, it is contemplated that system 100 and method 200 may be similarly applied for reclaiming constituent components of other types of sealed batteries.

For instance, system 100 and method 200 may be applied with some modification to operate with a feedstock of lithium button cells, namely rechargeable lithium ion batteries or lithium polymer batteries, instead of alkaline batteries. With such a lithium battery, the anode is constituted of lithium metal or lithium compound. The cathode is typically constituted of manganese dioxide and the electrolyte is commonly constituted of lithium perchlorate in propylene carbonate and dimethoxyethane.

In this case, modifications necessitated to system 100 and method 200 would be primarily to manage the risk of combustion associated with a lithium ion battery feedstock, inherently due to the more physically and chemically active nature of the electrolytes and chemical compounds which may be present. For instance, the temperature of conveyor oven 204 should be maintained below the combustion temperature of paper (approximately 450° F.).

Further, when system 100 is run with alkaline batteries, where the conveyor of oven 204 is run at a low speed and high temperature (to promote evaporation of mercury) as discussed above, with lithium batteries, the conveyor of oven 204 is run at a mid-speed and temperature (to avoid combustion of lithium and compounds). When the system 100 is run with nickel metal hydride batteries, the conveyor of oven 204 may be run at higher speeds and temperatures.

In this modified system, when the lithium ion batteries are ground and transported by the conveyor oven 204, off-gasses of the lithium compounds pass to scrubber 208 where they are sequestered. Any electrolytes and chemical compounds, as well as any volatile organic compounds (VOCs) which escape scrubber 208 may be condensed using atomized water from an atomizer, the condensed lithium compounds and VOCs passing into a holding water tank. The pH level of the water in the atomizer and the tank may be controlled with, for example, the addition of sodium hydroxide to a concentration of 50%, to ensure any gas remains condensed in the water. Any paper constituents drawn off may be captured by filtering before it reaches the scrubber 208 so that it will not obstruct the scrubber 208 functioning.

With lithium cells, at the screen 205, the powder which drops out will be typically lithium cobalt oxide, but can vary depending on the chemical composition of the particular lithium ion battery. This powder can be used in the coatings industry. As before, a 2 to 200 mesh size may be appropriate to limit contamination of this powder.

The magnetic fraction, or constituent, separated by the magnetic separator 214 (a magnetic wheel, in one embodiment) includes stainless steel and magnetic alloys as well as any copper that is captured or encompassed by the stainless steel and magnetic alloys. A specific gravity separator may be applied to separate non-ferrous fluff encapsulated within this magnetic component, and also to separate the stainless steel, magnetic alloys, and copper from each other.

Other modifications will be apparent to those skilled in the art without departing from the scope of the following claims.

What is claimed is:

1. A method of reclaiming constituent components of a feedstock of sealed batteries, the method comprising:
    (a) grinding the feedstock to form a ground feedstock;
    (b) heating the ground feedstock to form a dried feedstock;
    (c) screen separating the dried feedstock into a coarse fraction and a powder fraction, the coarse fraction including a magnetic fraction and a non-magnetic fraction;
    (d) passing the coarse fraction to a vibrating feed to convey the coarse fraction to the magnetic separator; and
    (e) magnetically extracting the magnetic fraction from the coarse fraction.

2. The method of claim 1 wherein the powder fraction of the dried feedstock comprises zinc oxide, manganese dioxide, and potassium hydroxide.

3. The method of claim 1 wherein the sealed batteries are alkaline batteries containing mercury, further comprising heating the ground feedstock below the boiling point of mercury wherein the heating evaporates a portion of the mercury from the ground feedstock.

4. The method of claim 3 further comprising forcing air through the ground feedstock during the heating to flush the mercury vapor from the ground feedstock.

5. The method of claim 4 further comprising sequestering the mercury vapor in a scrubber.

6. The method of claim 4 further comprising precipitating particulates contained in the forced air by swirling the forced air.

7. The method of claim 1 wherein the heating is performed to achieve a specified maximum moisture content for the powder fraction of the dried feedstock.

8. A method of reclaiming constituent components of a feedstock of sealed batteries, the sealed batteries including at least a mercury constituent component, the method comprising:
    (a) grinding the feedstock to form a ground feedstock;
    (b) heating the ground feedstock to form a dried feedstock, the heating performed below the boiling point of mercury wherein a portion of the mercury constituent is evaporated from the dried feedstock;
    (c) screen separating the dried feedstock into a coarse fraction and a powder fraction, the coarse fraction including a magnetic fraction and a non-magnetic fraction;
    (d) passing the coarse fraction from step (c) to a vibrating feed with a vibrating screen for further separating out powder fraction from the coarse fraction; and
    (e) outputting the powder fraction.

9. The method of claim 8 wherein the powder fraction of the dried feedstock comprises zinc oxide, manganese dioxide, and potassium hydroxide.

10. The method of claim 1 wherein the vibrating feed has a vibrating screen for further separating out powder fraction from the coarse fraction.

* * * * *